WITNESSES:

INVENTOR
Charles B. Heffron
BY
ATTORNEY

United States Patent Office 3,189,782

Patented June 15, 1965

3,189,782

TELEVISION HORIZONTAL SCANNING CIRCUIT UTILIZING CONTROLLED RECTIFIERS

Charles B. Heffron, Metuchen, N.J., assignor to Westinghouse Electric Corporation, Pittsburgh, Pa., a corporation of Pennsylvania Filed Nov. 20, 1962, Ser. No. 238,874
17 Claims. (Cl. 315—27)

The present invention relates to horizontal scanning circuits for use in television receivers or the like and more particularly to scanning circuits employing solid state variable conductive devices in place of the electron tubes as more commonly used.

The conventional basic scanning circuit used with the United States system of television to generate a horizontal scanning alternating current that is essentially linear during the trace interval of about 54.5 microseconds and that will flyback during the retrace interval of about 9 microseconds with a frequency of 15,750 cycles per second is comprised of a source of direct current, a horizontal deflection or yoke coil and associated resonating capacitor, and a switch including various arrangements of thermionic devices adapted to be periodically closed to effectively clamp the yoke coil to the source of direct current only during the trace interval. Since it is desired that the trace current vary in approximately linear form from a high value of one polarity, usually negative, to a high value of the other polarity, the switch must be a bi-directional current switch and since at the time the switch is opened at the end of the trace current interval, a maximum current is flowing and the voltage across the switch is rising rapidly, a considerable amount of power may be dissipated in the switch during its turn-off time. Therefore, when using solid state devices such as silicon controlled rectifiers and diodes in circuits to function as the bi-directional current switch in a horizontal scanning circuit, arrangements must be provided to prevent damage to the solid state devices in their operation. For example, if a solid state controllable rectifier such as a silicon controlled rectifier is used as part of the switch circuit to enable the switch to be selectively turned on to clamp the yoke coil to the source at the correct time at the beginning of each horizontal trace interval, some means must be provided to enable the controlled rectifier to become non-conducting during the trace interval in order that it will be non-conductive during the retrace interval and will not again become conductive until triggered on at the desired time at the beginning of the next trace interval. Also, assuming that the solid state controlled rectifier becomes non-conductive during the trace interval, additional means such as a diode, properly poled, must be provided to be conductive whenever the controlled rectifier is non-conductive during the trace interval to thereby continue to clamp the yoke coil to the direct current source and preserve the desired linearity of the scanning current during the entire trace interval. Both the diode and the controlled rectifier should be non-conductive at the end of the trace interval and remain non-conductive during the retrace interval. In order to improve reliability and enable relatively inexpensive solid state devices to be used, it is desirable to avoid the continuous flow of large amounts of direct current through the devices.

It is, therefore, a principal object of the present invention to provide an improved horizontal scanning circuit for television receivers or the like employing solid state switching devices.

Another important object of the invention is to provide an improved solid state scanning circuit arranged to minimize the energy dissipated in the solid state devices in order that inexpensive devices may be used with a maximum of reliability.

In accordance with the invention, a solid state controlled rectifier which may be a silicon controlled rectifier of the type known by the trademark "Trinistor" is connected in parallel, but with reversed polarity to a solid state diode and such parallel connected rectifier and diode are connected in series with a source of direct current and a yoke coil with its associated resonating capacitor in a manner to function as a bi-directional current switch to clamp the coil to the source during the trace interval. A feature of this invention is the provision of a resonant circuit adapted to be energized during the retrace interval and to oscillate during the trace interval and connected to the diode and rectifier in a manner to superimpose and combine its oscillating current with the oscillating and alternating trace current to enable the diode to become conductive at least once during the trace interval and the controlled rectifier to become non-conductive by reducing the current flow through the rectifier below its holding current value whenever the diode becomes conductive. Gate pulse means which may be timed by the conventional automatic frequency control circuits of the television receiver is connected to the controlled rectifier in a manner to make the rectifier conductive at the desired time at the beginning of the trace interval and at any other time during the trace interval whenever the diode is non-conductive. The frequency and phase of the resonant circuit is determined to be such that the diode will be last conductive and caused be non-conductive at the end of the trace interval so that both the diode and rectifier are non-conductive during the retrace interval when energy is restored to the oscillating circuits.

Thus, in such manner, the solid state controlled rectifier and diode devices are caused to be alternately conductive during the trace interval to clamp the yoke coil to the source so that the total energy dissipated during the trace interval is distributed between the devices and the total energy requirements during turn-off for each of the devices are held to reasonable limits enabling inexpensive devices to be used with reliability.

Further objects, features and the attending advantages of the invention will be apparent with reference to the following specification and drawings, in which:

FIGURE 1 is schematic diagram of a first embodiment of the invention;

FIG. 2 includes curves A through H which are a family of waveform curves to show the operation of the circuit of FIG. 1;

FIG. 3 is a schematic diagram of a second embodiment of the invention;

FIG. 4 includes curves A through G which are a family of waveform curves to show the operation of the circuit arrangement of FIG. 3;

Figure 1:
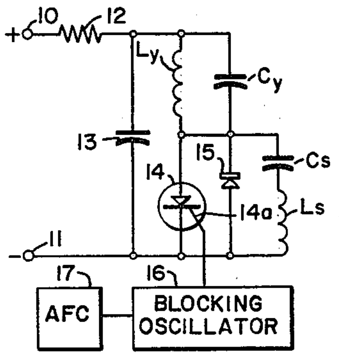

Referring now to FIG. 1 of the drawing, a source of direct current is represented by the terminals 10 and 11 with the polarity as indicated. A current limiting resistor 12 and capacitor 13 are connected in series across the terminals 10 and 11. The use of the current limiting resistor 12 and capacitor 13 to limit the maximum current flow through either of the solid state devices to be described, is preferred, but not essential as they may be omitted if desired without affecting the basic functioning of the circuit to be described. According to the invention, a horizontal scanning yoke coil $L_y$ and its associated reasonating capacitor $C_y$ are connected in parallel with each other and in series with the solid state controlled rectifier device 14 and the diode 15 across the source of direct current represented by the capacitor 13 and the terminals 10 and 11. It will be noted that the parallel connected solid state controlled rectifier device 14 and diode 15 are connected in parallel back to back with each other with opposite polarity. The arrangement is such that whenever either the solid state controlled rectifier 14 of the diode 15 is conducting, the horizontal scanning yoke coil $L_y$ and its associated resonating capacitor $C_y$ are clamped to the voltage of the source as may be represented by the terminals 10 and 11 together with the current limiting resistance 12 and capacitor 13.

An important feature of the invention is the provision of the resonant circuit comprising the capacitor *Cs* and inductance *Ls* which in the embodiment of the invention now being described are connected as a series resonant circuit in parallel with the parallel connected combination of controlled rectifier 14 and diode 15. The series resonant circuit including the capacitor *Cs* and inductor *Ls* assures that an oscillating current of proper phase and magnitude is present to turn-off the controlled rectifier 14 by reducing the current level in the controlled rectifier below its holding current level and to alternately switch on the diode 15 so that the controlled rectifier 14 and the diode 15 are alternately switched between conducting and nonconducting states to maintain a linear current through the scanning yoke coil $L_y$ during all of the trace current interval. The frequency of oscillation for the series resonant circuit including the capacitor *Cs* and inductor *Ls* may be chosen to be approximately the same as the frequency of the horizontal scanning current in the horizontal yoke coil $L_y$ or may be an approximate harmonic multiple of the frequency of the scanning current, as will be more fully described hereafter.

In order to cause the solid state controlled rectifier 14 to become conductive at the desired time at the beginning of the trace current interval and at any other time during the trace interval when the diode 15 is not conducting, a blocking oscillator 16 is connected to apply gate pulses to the gate electrode 14*a* of the controlled rectifier 14. The circuit for the blocking oscillator 16 may take various forms which are well known to those skilled in the art and, therefore, a detailed circuit has not been shown for the blocking oscillator as only shown by the block outline 16. Also, as may be conventional and well understood to those skilled in the art, an automatic frequency control circuit as conventionally provided in a television receiver is shown by the block outline 17 and may be connected to the blocking oscillator 16 to synchronize the production of gate pulses for exactly predetermining and synchronizing the initiation of trace current through the solid state controlled rectifier 14 at the beginning of each horizontal trace interval.

Figure 2:
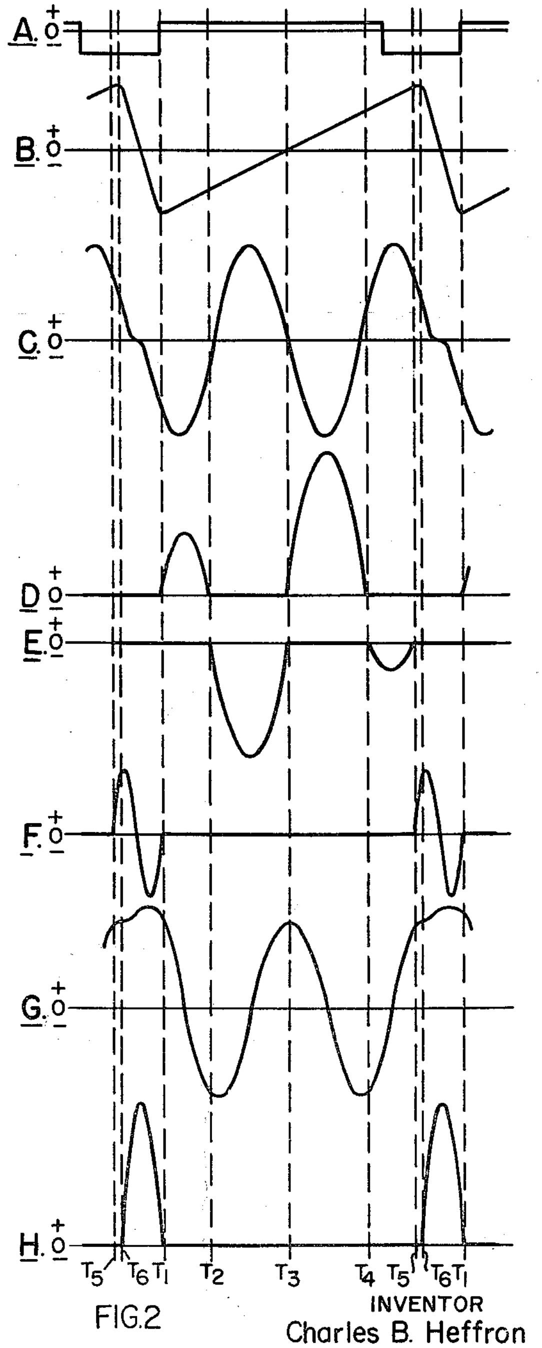

Referring now to FIG. 2, curves A–H, of the drawings, the voltage waveform for the gating pulse connected to the solid state controlled rectifier gate 14A is shown by curve A while the waveform of scanning current through the horizontal scanning yoke coil $L_y$ is shown by the curve B. Curve C shows the waveform of current through the resonant circuit including the capacitor *Cs* and inductor *Ls* and curve D shows the waveform of the anode current for the solid state controlled rectifier 14. Curve E shows the waveform of current through the diode 15 and curve F shows the waveform of current at the yoke resonating capacitor $C_y$. In addition, curve G shows the waveform of voltage across the resonating capacitor *Cs* and curve H shows the waveform of the anode-cathode voltage appearing across the solid state controlled rectifier 14. Each of the waveforms, A–H are related to each other over a time period varying from $T_1$ through $T_6$ and back to $T_1$ representing a complete cycle of oscillating and alternating horizontal trace and retrace yoke current in the horizontal yoke coil $L_y$.

Referring to the time $T_1$ as the beginning of the trace current interval, it will be seen that the yoke current or, in other words, the horizontal scanning current varies linearly or approximately linearly from a maximum negative value at the time $T_1$ to a maximum positive value at the time $T_6$. From the time $T_6$ to the time $T_1$ the yoke current oscillates back from the high positive value to the high negative value during what is termed the retrace or flyback interval. At the time $T_1$ when the yoke current is at a large negative value equal to the current in the *Cs*, *Ls* series resonant circuit, the gate of the Trinistor controlled rectifier is driven positive as indicated by the waveform curve A to make the rectifier 14 conductive and the anode current for the solid controlled rectifier 14 begins to increase from zero, as indicated by curve D. During the period $T_1$ to $T_5$ the yoke current of curve B is sum of the currents through the capacitor *Cs* and inductor *Ls*, and through either the diode 15 or the solid state controlled rectifier 14 depending upon which of the solid state devices is conducting as will be further described. Such current, during the trace interval as indicated by curve B, is, therefore, linear or substantially so since during the period $T_1$ to $T_5$ the solid state controlled rectifier 14 and the diode 15 alternately clamp the yoke coil $L_y$ to the direct current source. In the embodiment of the invention of FIG. 1, now being described, the values for the capacitor *Cs* and inductor *Ls* are chosen so that the resonant frequency of such combination occurs at about twice the horizontal scanning frequency for the yoke current of curve B. From $T_1$ to $T_2$ the diode current curve E is zero and the yoke current FIG. 2B is the difference between the solid state controlled rectifier current curve D and the oscillating current in capacitor *Cs* and inductor *Ls*. At time $T_2$ the decreasing yoke current curve B is less than that required by the difference between the solid state controlled rectifier current 14 and the current in capacitor *Cs* and inductor *Ls*. The current in the solid state controlled rectifier 14, therefore, falls below its holding current level and the rectifier 14 turns off to become non-conductive. At the same time $T_2$, diode 15 turns on and from time $T_2$ to $T_3$ the diode current adds to the current in the capacitor *Cs* and inductor *Ls* to provide the yoke current as indicated by curve B. At time $T_3$ the diode current, as indicated by curve E falls to zero and the solid state controlled rectifier, again becomes conductive since the gate pulse voltage is still positive as indicated by curve A. Therefore, at time $T_3$ the current through the controlled rectifier 14 adds to the current through capacitor *Cs* and inductor *Ls* to provide the yoke current from time $T_3$ to $T_4$, as indicated by curve A. At time $T_4$ the process again reverses to reduce the holding current through the controlled rectifier 14 below its holding current value and to make the diode 15 again conductive to add to its current, the current in the capacitor *Cs* and inductor *Ls* between times $T_4$ and $T_5$ to thus provide the linear yoke current, as indicated by curve B. At time $T_5$ the current in both the diode 15 and the solid state controlled rectifier is zero. Also, at that time the gate signal, as indicated by curve A; is of negative polarity so as not to turn on the controlled rectifier 14. The horizontal scanning yoke current curve B is equal to the current in the capacitor *Cs* and inductor *Ls* circuit and with controlled rectifier 14 and diode 15 both non-conducting, the path of the oscillating current in the capacitor *Cs* and inductor *Ls* is now through the yoke coil $L_y$ and capacitor $C_y$ and the voltage across capacitor $C_y$ is equal to the supply voltage across capacitor 13. Since the voltage on capacitor $C_y$ does not change instantaneously, the yoke current of curve B continues to increase at a decreasing rate as capacitor $C_y$ discharges from battery voltage to zero between the time $T_5$ and $T_6$. The waveform of the current for the capacitor $C_y$ is shown by curve F. From time $T_6$ to time $T_1$, the horizontal scanning current in the yoke coils curve B and its voltage go through a half-cycle of sinusoidal oscillation whose period is determined by the parallel combination of the yoke coil $L_y$ and capacitor $C_y$ together with the resonant circuit capacitor $Cs$ and inductor $Ls$ which is recharged with energy at this time. It will be noted that the yoke current of curve B is larger at time $T_6$ than at time $T_1$ by the amount required to replace circuit losses and it is again emphasized that the losses in the series resonant circuit including the capacitor $Cs$ and inductor $Ls$ are also replaced during the retrace interval from time $T_6$ to time $T_1$ when the rapidly reversing yoke current recharges capacitor $C_y$ to its maximum value. At time $T_1$ the solid state controlled rectifier is again turned on by the gate pulse of curve A as supplied from the blocking oscillators 16 controlled by the automatic frequency control circuit 17. In summary, it will be noted that when the frequency of oscillation for the resonant circuit including the capacitor $Cs$ and inductor $Ls$ is chosen to be approximately twice the horizontal scanning frequency the solid state controlled rectifier 14 and the diode 15 are each caused to become conductive twice during the trace interval from time $T_1$ to time $T_6$. Also, with the resonant circuit including capacitor $Cs$ and inductor $Ls$, connected as shown, the arrangement is such that the diode 15 is last conductive during the trace interval and is caused to become non-conductive and remain non-conductive together with the solid state controlled rectifier 14 during the retrace interval.

Figure 3:
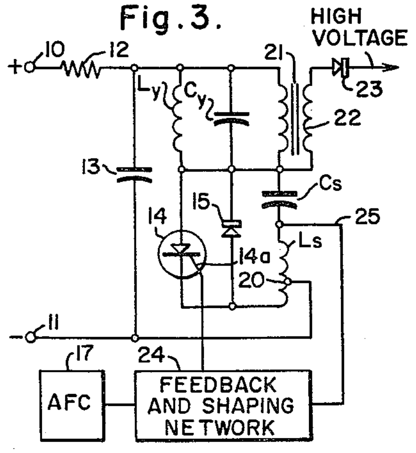

Referring now to FIG. 3 of the drawings, a different embodiment of the invention will be described. However, where elements which are the same as that shown and described in connection with FIG. 1 of the drawings are used in the same manner they have been given the same reference numerals and will not again be described in detail. In the embodiment of FIG. 3 the resonant circuit including the capacitor $Cs$ and the inductor $Ls$ is tuned to resonate at approximately the same frequency as the horizontal scanning frequency of scanning current in the yoke coil $L_y$. In this arrangement the solid state controlled rectifier 14 and the diode 15 are thereby each caused to be conductive only once during the trace interval as will be seen by reference to the waveforms of FIG. 4, curves A–G to be later referred to in some detail. The arrangement of FIG. 3 also differs from FIG. 1 in that the source of direct current accross the capacitor 13 is connected to a tap 20 on the series resonant inductor coil $Ls$ so that a component of the voltage in the inductor $Ls$ is combined with the voltage of the source 13 to modify the source voltage so that the scanning current in the horizontal yoke coil $L_y$ during the trace interval has a modified linearity as indicated by curve B to compensate for the curvature of the cathode ray picture tube face, as is well known. In addition, a high voltage transformer 21 is inductively related to the scanning current in the horizontal yoke coil $L_y$ in a manner to generate high voltage pulses in its secondary winding 22 for rectification by the diode 23 to provide high voltage for the cathode ray picture tube as is conventional in the art. Yet another distinctive feature of the embodiment of FIG. 3 of the drawings is the connection of the feedback and pulse shaping network 24 between the connection 25 at the series resonant coil $Ls$ and the gate 14*a* of the solid state controlled rectifier 14. Such interconnection, as should be obvious to one skilled in the art, will make the scanning circuit of FIG. 3 self-oscillatory and it may be properly synchronized to the television signal by the conventional automatic frequency control circuit 17, as previously mentioned.

Figure 4:
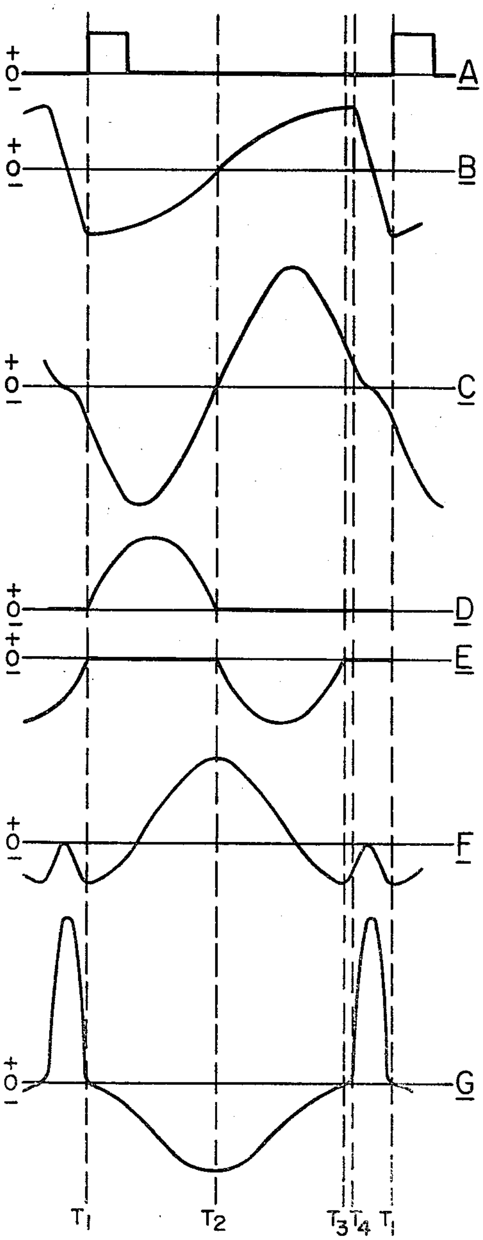

Referring to the waveforms of FIG. 4, curves A–G, it will be seen that the gate pulse has a positive value for a short duration at the beginning of each horizontal trace time $T_1$ to thus turn on the solid state controlled rectifier 14. The yoke current indicated by curve B is a modified linear form between the time $T_1$ and $T_4$. It will be seen by curve F that the voltage of the series inductor $Ls$ during the horizontal trace time $T_1$–$T_4$ is a cosine wave which when added to the supply voltage across capacitor 13 distorts the yoke current curve B, as indicated between the time $T_1$–$T_4$ to thus compensate for the curvature of the picture tube face. The anode current for the solid state controlled rectifier is shown by curve D while the solid state rectifier 14 is conducting during the time interval $T_1$–$T_2$ and the diode current for the diode 15 is shown by curve E during the time interval $T_2$–$T_3$ when the diode 15 is conducting and the solid state controlled rectifier 14 is turned off. Curve C shows the waveform of current in the series resonant circuit including the capacitor $Cs$ and inductor $Ls$ and curve G shows the waveform of voltage from anode-to-ground for the solid state controlled rectifier 14 during the complete cycle of horizontal scanning current from time $T_1$ through $T_4$ and back to time $T_1$.

Figure 5:
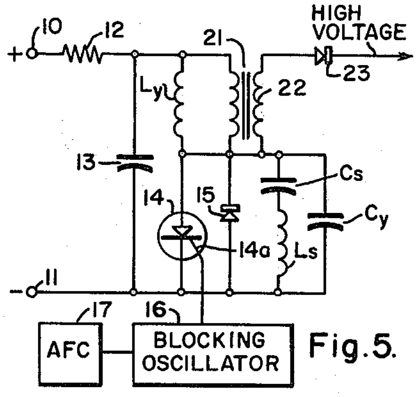
FIG. 5 is a schematic diagram of yet another embodiment of the invention.

FIG. 5 shows a variational embodiment of an invention which is similar to the embodiment described in connection with FIG. 1 and FIG. 2, curves A–H. The basic difference in the embodiment of FIG. 5 relative to the embodiment of FIG. 1 is that the resonating capacitor $C_y$ for the yoke coil $L_y$ is connected in series with the yoke coil $L_y$ instead of in parallel with it. In addition, the high voltage transformer 21 and associated elements are shown to be connected in parallel with the yoke coil $L_y$ and thus inductively related to the scanning current in the yoke coil. It should be obvious to one skilled in the art that the yoke coil $L_y$ and its resonating capacitor $C_y$ may be variously related in circuit with each other and it is believed that the operation of the circuit of FIG. 5 will be obvious in view of the preceding descriptions of the operation of other embodiments of the invention.

Figure 6:
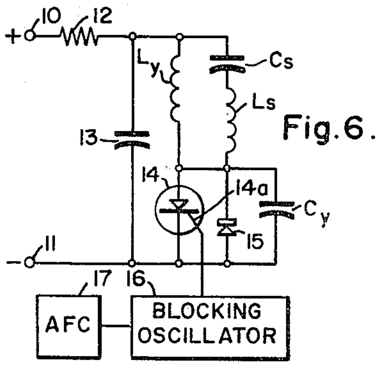
FIG. 6 is a schematic diagram of a further variational embodiment of the invention.

Yet another variational embodiment of the invention is shown by FIG. 6 of the drawing and in this arrangement the resonant circuit including the capacitor $Cs$ and the inductor $Ls$ are connected in parallel to the yoke coil $L_y$ and in series with the solid state controlled rectifier 14 and diode 15. Again, the operation of this form of invention is similar to that previously described in detail and is believed to be obvious to those skilled in the art.

Figure 7:
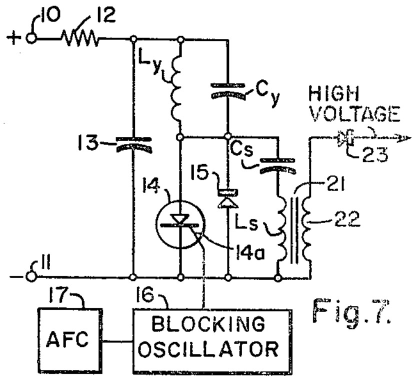
FIG. 7 is a circuit diagram of yet another embodiment of the invention.

A further embodiment of the invention is shown by FIG. 7 of the drawing. This embodiment of the invention is essentially the same as that shown and described in connection with FIG. 1 of the drawing except that the high voltage transformer 21 is inductively related to the series resonant coil Ls instead of to the yoke coil $L_y$.

The following is a list of typical circuit parameters which may be used for the embodiment of FIG. 3 of the drawings when the series resonant circiut including the capacitor $Cs$ and the inductor $Ls$ is tuned to resonate at the same frequency or approximately the same frequency as the frequency of the horizontal scanning current in the yoke coil $L_y$. The supply voltage appearing across terminals 10 and 11 is approximately 46 volts and a current of up to 375 milliamperes at such voltage is required:

| | |
|---|---|
| Resistor 12 | 23 ohms. |
| Capacitor 13 | 4 microfarads. |
| Capacitor $C_y$ | .02 microfarad. |
| Yoke coil $L_y$ | 660 microhenries. |
| Solid state controlled rectifier 14 | Westinghouse Type 2N1770 or Type 2N1842. |
| Diode 15 | Type 1N1224. |
| Capacitor $Cs$ | .064 microfarad. |
| Coil Ls | Ferrite core approximately 1.5 microhenries. |

It should be obvious that the invention may take various forms and modifications within the scope of the claims. For example, the parameters for the resonating circuit including the capacitor C *s* and the inductor $Ls$ may be chosen to be various different multiples of the frequency of the horizontal scanning current in which case the solid state controlled rectifier and diode 15 will be caused to become alternately conductive at various different times during the trace current interval. Also, as indicated the yoke capacitor $C_y$ may be placed at various points in the circuit, the high voltage transformer 21 may be placed at various points in the circuit, and the series resonant circuit including capacitor $C_s$ and inductor $L_s$ may be placed at various points in the circuit as will be obvious to one skilled in the art so long as the functioning of the resonant circuit is such as to superimpose its oscillating current in a manner to enable the solid state controlled rectifier 14 and the diode 15 to become alternately conducting during the trace current interval and to assure that both the diode 15 and the solid state controlled rectifier 14 will be non-conductive during the retrace current interval. Also, when the resonant circuit is caused to resonate at a multiple of the horizontal scanning frequency, the duty cycle of the blocking oscillator 16 must be such as to provide a positive gate pulse duration long enough to insure that the controlled rectifier 14 will become conductive at the plurality of different times as may be required during the trace interval.

I claim as my invention:

1. In a solid state horizontal scanning circuit for a television receiver or the like having, a source of direct current, a horizontal scanning yoke coil, a resonating capacitor connected in circuit with said coil, and a bi-directional current switch connected in series with said coil and said source to be periodically closed to clamp said coil to said source during passage of oscillating trace current through said coil from a high value of one polarity to a high value of the other polarity and to be periodically opened during passage of oscillating retrace current through said coil from the high value of other polarity to the high value of the one polarity, the bi-directional switch comprising, a solid state controlled rectifier and a diode connected in parallel and with reverse polarity to each other, gating pulse means connected to said controlled rectifier to enable said rectifier to become conductive only during passage of trace current through said coil, a resonant circuit operative to store energy when retrace current flows through said coil and to oscillate during passage of trace current through said coil, and means connecting said resonant circuit and said parallel connected diode and rectifier to apply the oscillating current thereto to cause said diode to become conductive at least once during the flow of trace current through said coil and to enable said rectifier to become non-conductive whenever said diode becomes conductive by reducing the current flow through said rectifier below its holding current value, the frequency and phase of oscillation of said resonant circuit being determined to enable said diode to change from conductive to non-conductive state as the current through said coil reaches the high value of other polarity at the end of the flow of trace current through said coil whereby both said rectifier and said diode remain non-conductive during the flow of retrace current in said coil and said resonant cricuit.

2. In a solid state horizontal scanning circuit for a television receiver or the like having, a source of direct current, a horizontal scanning yoke coil, a resonating capacitor connected in circuit with said coil, and a bi-directional current switch connected in series with said coil and said source to be periodically closed to clamp said coil to said source during passage of oscillating trace current through said coil from a high value of one polarity to a high value of the other polarity and to be periodically opened during passage of oscillating retrace current through said coil from the high value of other polarity to the high value of the one polarity, the bi-directional switch comprising, a solid state controlled rectifier and a diode connected in parallel and with reverse polarity to each other, gating pulse means connected to said controlled rectifier to enable said rectifier to become conductive only during passage of trace current through said coil, a series resonant circuit operative to store energy when retrace current flows through said coil and to oscillate during passage of trace current through said coil, and means connecting said series resonant circuit to said parallel connected diode and rectifier to apply the oscillating current thereto to cause said diode to become conductive at least once during the flow of trace current through said coil and to enable said rectifier to become non-condutive whenever said diode becomes conductive by reducing the current flow through said rectifier below its holding current value, the frequency and phase of oscillation of said series resonant circuit being determined to enable said diode to change from conductive to non-conductive state as the current through said coil reaches the high value of other polarity at the end of the flow of trace current through said coil whereby both said rectifier and said diode remain non-conductive during the flow of retrace current in said coil and said series resonant circuit.

3. In a solid state horizontal scanning circuit for a television receiver or the like having, a source of direct current, a horizontal scanning yoke coil, a resonating capacitor connected in circuit with said coil, and a bi-directional current switch connected in series with said coil and said source to be periodically closed to clamp said coil to said source during passage of oscillating trace current through said coil from a high negative value to a high positive value and to be periodically opened during passage of oscillating retrace current through said coil from the high positive value to the high negative value, the bi-directional switch comprising, a solid state controlled rectifier and a diode connected in parallel and with reverse polarity to each other, gating pulse means connected to said controlled rectifier to enable said rectifier to become conductive only during passage of trace current through said coil, a series resonant circuit operative to store energy when retrace current flows through said coil and to oscillate during passage of trace current through said coil, and means connecting said series resonant circuit to said parallel connected diode and rectifier to apply the oscillating current thereto to cause said diode to become conductive at least once during the flow of trace current through said coil and to enable said rectifier to become non-conductive whenever said diode becomes conductive by reducing the current flow through said rectifier below its holding current value, the frequency and phase of oscillation of said series resonant circuit being determined to enable said diode to change from conductive to non-conductive state as the current through said coil reaches the high positive value at the end of the flow of trace current through said coil whereby both said rectifier and said diode remain non-conductive during the flow of retrace current in said coil and said series resonant circuit.

4. A solid state horizontal scanning circuit for television receivers and the like comprising, a source of direct current, a horizontal scanning yoke coil, a resonating fly-back capacitor connected in circuit with said yoke coil and said source to determine the frequency of the oscillating scanning current through said yoke coil, a solid state controlled rectifier connected in series with said yoke coil and said source of direct current, a diode connected in parallel with said rectifier but with reverse polarity to said rectifier, means connecting a gate pulse to said rectifier in a manner to cause said rectifier to become conductive whenever the oscillating scanning current through said yoke coil is changing from a high value of one polarity to a high value of the other polarity to clamp said yoke to said source while conductive, and a resonant circuit tuned to a frequency related to the frequency of the oscillating scanning current through said yoke coil, said resonant circuit connected in circuit with said rectifier and diode in a manner to reduce the current through said rectifier below the holding current of said rectifier while the oscillating scanning current through said yoke coil is changing from the high value of one polarity to a high value of the other polarity and to thereby cause said rectifier to become non-conducting and said diode to become conducting to clamp said yoke to said source while said diode conducts, said diode being poled relative to the oscillating current of the resonant circuit to become nonconductive when the oscillating scanning current through said yoke flies back from the high value of other polarity to the high value of one polarity.

5. A solid state horizontal scanning circuit for television receivers and the like comprising, a source of direct current, a horizontal scanning yoke coil, a yoke resonating fly-back capacitor connected in circuit with said yoke coil and said source to determine the frequency of the oscillating scanning current through said yoke coil, a solid state controlled rectifier connected in series with said yoke coil and said source of direct current, a diode connected in parallel with said rectifier but with reverse polarity to said rectifier, means connecting a gate pulse to said rectifier in a manner to cause said rectifier to become conductive whenever the oscillating scanning current through said yoke coil starts to decline from a high positive value to zero to clamp said yoke to said source while conductive, and a resonant circuit tuned to a frequency related to the frequency of the oscillating scanning current through said yoke coil, said resonant circuit connected in circuit with said rectifier in a manner to reduce the current through said rectifier below the holding current of said rectifier when the oscillating scanning current through said yoke coil begins to increase from zero to a high negative value to thereby cause said rectifier to become non-conducting and said diode to become conducting to clamp said yoke to said source while said diode conducts, said diode being poled relative to the oscillating current of the resonant circuit to become non-conductive when the oscillating scanning current through said yoke flies back from the high negative value to the high positive value.

6. A solid state horizontal scanning circuit for television receivers and the like comprising, a source of direct current, a horizontal scanning yoke coil, a yoke resonating fly-back capacitor connected in circuit with said yoke coil and said source to determine the frequency of the oscillating scanning current through said yoke coil, a silicon controlled rectifier connected in series with said yoke coil and said source of direct current, a diode connected in parallel with said rectifier but with reverse polarity to said rectifier, means connecting a gate pulse to said rectifier in a manner to cause said rectifier to become conductive whenever the oscillating scanning current through said yoke coil starts to decline from a high positive value to zero to clamp said yoke to said source while conductive, and a series resonant circuit tuned to the same frequency as the frequency of the oscillating scanning current through said yoke coil, said series resonant circuit connected in circuit with said rectifier in a manner to reduce the current through said rectifier below the holding current of said rectifier when the oscillating scanning current through said yoke coil begins to increase from zero to a high negative value to thereby cause said rectifier to become non-conducting and said diode to become conducting to clamp said yoke to said source while said diode conducts, said diode being poled relative to the oscillating current of said series resonant circuit to become non-conductive when the oscillating scanning current through said yoke flies back from the high negative value to the high positive value.

7. In a solid state horizontal scanning circuit for a television receiver or the like having, a source of direct current, a horizontal scanning yoke coil, a resonating capacitor connected in circuit with said coil, and a bi-directional current switch connected in series with said coil and said source to be periodically closed to clamp said coil to said source during passage of oscillating trace current through said coil from a high negative value to a high positive value and to be periodically opened during passage of oscillating retrace current through said coil from the high positive value to the high negative value, the bi-directional switch comprising, a solid state controlled rectifier and a diode connected in parallel and with reverse polarity to each other, gating pulse means connected to said controlled rectifier to enable said rectifier to become conductive only during passage of trace current through said coil, a series resonant circuit connected to said bi-directional switch to be energized by retrace current through said coil and to oscillate during passage of trace current through said coil, and means connecting said series resonant circuit in parallel to said parallel connected diode and rectifier to apply thereto the oscillating current of said series resonant circuit causing said diode to become conductive at least once during the flow of trace current through said coil and enabling said rectifier to become non-conductive whenever said diode becomes conductive by reducing the current flow through said rectifier below its holding current value, the frequency and phase of oscillation of said series resonant circuit being determined to enable said diode to change from conductive to non-conductive state as the current through said coil reaches the high positive value at the end of the flow of trace current through said coil whereby both said rectifier and said diode remain non-conductive during the flow of retrace current in said coil and said series resonant circuit.

8. The invention of claim 7 in which a high voltage transformer is inductively connected to the flow of oscillating trace and retrace current in said coil.

9. In a solid state horizontal scanning circuit for a television receiver or the like having, a source of direct current, a horizontal scanning yoke coil, a resonating capacitor connected in circuit with said coil, and a bi-directional current switch connected in series with said coil and said source to be periodically closed to clamp said coil to said source during passage of oscillating trace current through said coil from a high negative value to a high positive value and to be periodically opened during passage of oscillating retrace current through said coil from the high positive value to the high negative value, the bi-directional switch comprising, a solid state controlled rectifier and a diode connected in parallel and with reverse polarity to each other, gating pulse means connected to said controlled rectifier to enable said rectifier to become conductive only during passage of trace current through said coil, a series resonant circuit tuned to the frequency of said oscillating trace and retrace current, said resonant circuit connected to said bi-directional switch to be energized by retrace current through said coil and to oscillate during passage of trace current through said coil, and means connecting said series resonant circuit in parallel to said parallel connected diode and rectifier to apply thereto the oscillating current of said series resonant circuit to cause said diode to become conductive once during the flow of trace current through said coil and to enable said rectifier to become non-conductive when said diode becomes conductive by reducing the current flow through said rectifier below its holding current value, the phase of oscillation of said series resonant circuit being determined to enable said diode to change from conductive to non-conductive state as the current through said coil reaches the positive value at the end of the flow of trace current through said coil whereby both said rectifier and said diode remain non-conductive during the flow of retrace current in said coil and said series resonant circuit.

10. The invention of claim 9 in which a high voltage transformer is inductively related to the flow of trace and retrace current in said coil.

11. In a solid state horizontal scanning circuit for a television receiver or the like having, a source of direct current, a horizontal scanning yoke coil, a resonating capacitor connected in circuit with said coil, and a bi-directional current switch connected in series with said coil and said source to be periodically closed to clamp said coil to said source during passage of oscillating trace current through said coil from a high negative value to a high positive value and to be periodically opened during passage of oscillating retrace current through said coil from the high positive value to the high negative value, the bi-directional switch comprising, a solid state controlled rectifier and a diode connected in parallel and with reverse polarity to each other, gating pulse means connected to said controlled rectifier to enable said rectifier to become conductive only during passage of trace current through said coil, a series resonant circuit tuned to a multiple of the frequency of said oscillating trace and retrace current, said resonant circuit connected to said bi-directional switch to be energized by retrace current through said coil and to oscillate during passage of trace current through said coil, and means connecting said series resonant circuit in parallel to said parallel connected diode and rectifier to apply thereto the oscillating current of said series resonant circuit to cause said diode to become conductive and non-conductive a plurality of times during the flow of trace current through said coil and to enable said rectifier to become non-conductive whenever said diode becomes conductive by reducing the current flow through said rectifier below its holding current value, the phase of oscillation of said series resonant circuit being determined to enable said diode to change from conductive to non-conductive state as the current through said coil reaches the high positive value at the end of the flow of trace current through said coil whereby both said rectifier and said diode remain non-conductive during the flow of retrace current in said coil and said series resonant circuit.

12. The invention of claim 11 in which a high voltage transformer is inductively related to the flow of trace and retrace current in said coil.

13. In a solid state horizontal scanning circuit for a television receiver or the like having, a source of direct current, a horizontal scanning yoke coil, a resonating capacitor connected in circuit with said coil, and a bi-directional current switch connected in series with said coil and said source to be periodically closed to clamp said coil to said source during passage of oscillating trace current through said coil from a high negative value to a high positive value and to be periodically opened during passage of oscillating retrace current through said coil from the high positive value to the high negative value, the bi-directional switch comprising, a solid state controlled rectifier and a diode connected in parallel and with reverse polarity to each other, gating pulse means connected to said controlled rectifier to enable said rectifier to become conductive only during passage of trace current through said coil, a series resonant circuit connected to said bi-directional switch to be energized by retrace current through said coil and to oscillate during passage of trace current through said coil, and means connecting said series resonant circuit in parallel to said yoke coil to apply thereto the oscillating current of said series resonant circuit to cause said diode to become conductive at least once during the flow of trace current through said coil and to enable said rectifier to become non-conductive whenever said diode becomes conductive by reducing the curent flow through said rectifier below its holding current value, the frequency and phase of oscillation of said series resonant circuit being determined to enable said diode to change from conductive to non-conductive state as the current through said coil reaches the high positive value at the end of the flow of trace current through said coil whereby both said rectifier and said diode remain non-conductive during the flow of retrace current in said coil and said series resonant circuit.

14. The invention of claim 13 in which a high voltage transformer is inductively related to the flow of trace and retrace current in said coil.

15. In a solid state horizontal scanning circuit for a television receiver or the like having, a source of direct current, a horizontal scanning yoke coil, a resonating capacitor connected in circuit with said coil, and a bi-directional current switch connected in series with said coil and said source to be periodically closed to clamp said coil to said source during passage of oscillating trace current through said coil from a high negative value to a high positive value and to be periodically opened during passage of oscillating retrace current through said coil from the high positive value to the negative high value, the bi-directional switch comprising, a solid state controlled rectifier and a diode connected in parallel and with reverse polarity to each other, gating pulse means connected to said controlled rectifier to enable said rectifier to become conductive only during passage of trace current through said coil, a series resonant circuit tuned to the frequency of said oscillating trace and retrace current, said resonant circuit connected to said bi-directional switch to be energized by retrace current through said coil and to oscillate during passage of trace current through said coil, means connecting said series resonant circuit in parallel to said parallel connected diode and rectifier to apply thereto the oscillating current of said series resonant circuit to cause said diode to become conductive once during the flow of trace current through said coil and to enable said rectifier to become non-conductive when said diode becomes conductive by reducing the current flow through said rectifier below its holding current value, the phase of oscillation of said series resonant circuit being determined to enable said diode to change from conductive to non-conductive state as the current through said coil reaches the high positive value at the end of the flow of trace current through said coil whereby both said rectifier and said diode remain non-conductive during the flow of retrace current in said coil and said series resonant circuit, said series resonant circuit including a coil having a tapped winding, and means connecting the tap of said winding to the source of direct current in a manner to modify the linearity of the trace current flowing through said yoke coil.

16. In a solid state horizontal scanning circuit for a television receiver or the like having, a source of direct current, a horizontal scanning yoke coil, a resonating capacitor connected in circuit with said coil, and a bi-directional current switch connected in series with said coil and said source to be periodically closed to clamp said coil to said source during passage of oscillating trace current through said coil from a high valve of one polarity to a high value of the other polarity and to be periodically opened during passage of oscillating retrace current through said coil from the high other polarity value to the high one polarity value, the bi-directional switch comprising, a solid state controlled rectifier and a diode connected in parallel and with reverse polarity to each other, gating pulse means connected to said controlled rectifier to enable said rectifier to become conductive only during passage of trace current through said coil, a resonant circuit operative to store energy during the flow of retrace current through said coil and to oscillate during passage of trace current through said coil, means connecting said resonant circuit in parallel to said parallel connected diode and rectifier to apply thereto the oscillating current of said resonant circuit to cause said diode to become conductive at least once during the flow of trace current through said coil and to enable said rectifier to become non-conductive whenever said diode becomes conductive by reducing the current flow through said rectifier below its holding current value, the frequency and phase of oscillation of said resonant circuit being determined to enable said diode to change from conductive to nonconductive state as the current through said coil reaches the high positive value at the end of the flow of trace current through said coil whereby both said rectifier and said diode remain non-conductive during the flow of retrace current in said coil and said series resonant circuit, said resonant circuit including a coil having a tapped winding, and means connecting the tap of said winding to the source of direct current in a manner to modify the linearity of the trace current flowing through said yoke coil.

17. In a horizontal scanning circuit operative with a source of direct current, the combination of: a horizontal scanning yoke coil to pass trace and retrace current therethrough, a resonating capacitor connected in circuit with said coil, a bi-directional current switch connected in series with said coil and said source, said bi-directional switch comprising, a controlled rectifier and a diode connected in parallel and with reverse polarity to each other, gating pulse means connected to said controlled rectifier to enable said rectifier to become conductive only during passage of trace current through said coil, and energy storage means operatively connected to said bi-directional switch and being operative to store energy during the flow of retrace current through said coil when said switch is non-conductive in both directions in response to said storage means, said diode of said bi-directional switch being conductive at least once during the flow of trace current through said coil, with said controlled rectifier becoming non-conductive whenever said diode becomes conductive and said diode becoming non-conductive substantially at the end of the flow of trace current in said coil.

No references cited.

DAVID G. REDINBAUGH, *Primary Examiner.*